3,516,982
MONOAZO DYES CONTAINING A 2-NITRO DIPHENYLAMINE
Peter Dimroth and Kurt Mayer, Ludwigshafen (Rhine), Germany, assignors to Badische Anilin- & Soda-Fabrik Aktiengesellschaft, Ludwigshafen (Rhine), Germany
No Drawing. Filed July 7, 1966, Ser. No. 563,381
Claims priority, application Germany, July 16, 1965, 1,544,379
Int. Cl. C09b 29/08; D06p 1/02
U.S. Cl. 260—206
6 Claims

ABSTRACT OF THE DISCLOSURE

Disperse azo dyes derived from an aniline diazo component and a 2-nitro-diphenyl-amine coupling component, useful for dyeing synthetic polyester fibers.

The invention relates to new water-insoluble azo dyes having the general Formula I:

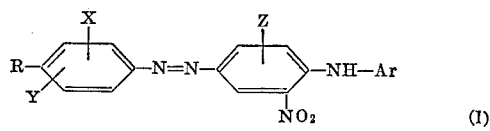

in which R denotes a hydrogen atom, a chlorine atom, a bromine atom, a nitro group, a carbalkoxy group, a dialkylsulfonamido group, a dialkylcarboxylamide group or a carbamoyl group, Ar denotes a substituted phenyl radical which is nevertheless free from carboxylic acid or sulfonic acid groups, and X, Y and Z denote hydrogen atoms, halogen atoms, nitro groups, alkyl groups, alkoxy groups or carbalkoxy groups having not more than four carbon atoms in the case of the three last-mentioned groups.

Dyes having the Formula I may be obtained for example by reaction of azo compounds having the general Formula II:

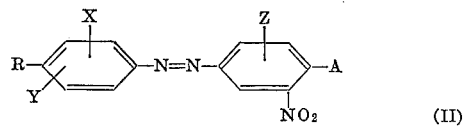

in which R, X, Y and Z have the meaning given above and A denotes a radical which can be eliminated as an anion, for example an arylsulfonic ester radical or preferably a halogen atom with amines having the formula ArNH₂ in which Ar has the meaning given above.

Compounds having the Formula II in which A denotes a halogen atom may be obtained for example from the corresponding azo dyes II in which A denotes a hydroxyl group by reaction with phosgene in the presence of dimethylformamide. This method is described in detail in French patent specification No. 1,439,401.

The azo dyes required for the purpose may be obtained by coupling diazo compounds of amines having the Formula III:

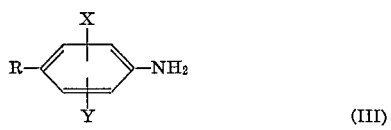

in which X and Y have the meanings given above, with o-nitrophenols.

As radicals

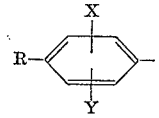

in Formula I, the following derived from amines having the Formula III may be given as examples: 4-nitraniline, 4-nitro-2-chloroaniline, 4 - nitro - 2 - methoxyaniline, 4-chloro-2-nitraniline, 2,4-dinitraniline, 4-dimethylaminosulfonylaniline, methyl p-aminobenzoate, 4-nitro-3-bromoaniline, 2,6-dichloro-4-nitraniline, 2,4,5-trichloroaniline or 4-nitro-2-toluidine.

Examples of radicals Ar in the Formula I are benzene radicals which bear nonionic radicals, such as amino groups, methoxy groups, chlorine atoms, dialkylamino groups, alkoxy groups, acylamino groups, alkylmercapto groups, phenylamino groups, arylamino groups, arylmercapto groups or alkoxycarbonylamino groups.

Specific examples of radicals Ar are those derived from the following amines (ArNH₂): p-phenylene diamine, N,N-dimethyl-p-phenylene diamine, N,N-di-β-hydroxyethyl-p-phenylene diamine, 4-chloroaniline, 4-anisidine, p-phenetidine, 4-methylmercaptoaniline, 2,4-dimethoxyaniline, 4-(β-hydroxyethoxy)-aniline, 4-(β-methoxyethoxycarbonylamino) - aniline, 3-methoxy-4-acetylaminoaniline, N-ethyl-N-β-hydroxyethyl-p-phenylene diamine, N-acetyl-p-phenylene diamine, 4-pyrrolidinoaniline, 4-(trichloroacetylamino)-aniline, 4,4'-diaminodiphenyl, 4,4'-diaminodiphenylamine, sulfanilodimethylamide, sulfanilodi-β-hydroxyethylamide, 4,4'-diaminodiphenyl sulfide, (4-methoxybenzoyl)-p-phenylene diamine, 4-methoxy-4'-aminodiphenylamine, 2-methoxy-4'-aminodiphenylamine, 2-carbomethoxy-4'-aminodiphenylamine, 4 - methoxy - 2 - carbomethoxy-4'-aminodiphenylamine, 2-nitro-4'-aminodiphenylamine or 4 - acetylamino - 4'-aminodiphenyl sulfide.

Reaction of compounds having the Formula II with the amines ArNH₂ is advantageously carried out in a temperature range from 80° to 190° C., if necessary under pressure. The relative amounts of the compounds to be reacted are as a rule stoichiometric or an excess of the amine is used. Especially in the case of inexpensive amines, it may be advisable to use the amine in a multiple excess, for example 2.5 times. It then serves at the same time as an acid-binding agent for the acid HA which is eliminated. If the amine is not used in excess, it is advantageous to add to the reaction mixture an acid-binding agent, such as sodium acetate, sodium carbonate, sodium bicarbonate, diethanolamine or tri-(β-hydroxypropyl)-amine.

Reaction is advantageously carried out in a solvent which is inert under the reaction conditions. Examples of suitable solvents are dimethylformamide, ethylene glycol, propylene glycol, methanol, ethanol, n-butyl alcohol, isobutyl alcohol, toluene, N-methylpyrrolidone, glycol monomethyl ether or dichlorobenzene.

Mixtures of these solvents may also be used without disadvantage. It is also possible to make direct use of a reaction mixture such as is obtained in the manufacture of the starting compounds of Formula II by halogenation of the corresponding coupling products obtained by the method described in French patent specification No. 1,439,401, and which contain for example dichlorobenzene as solvent, and to carry out the process according to the present invention after adding one of the said solvents, for example butanol, and the amine ArNH₂ without isolating the intermediate product having the Formula II.

The new dyes, which are obtained in a very good yield and in very good purity by the said process, are yellow to orange or uniform brown disperse dyes. They are particularly suitable for dyeing linear polyester textile material, for example fibers, filaments, flock, woven fabrics and knitted fabrics of polyethylene glycol terephthalate or based on terephthalic acid and p-dimethylolcyclohexane.

The dyes having the Formula I are advantageously used in finely divided form. Polyester textile material may be dyed with the dyes at temperatures of from 95° to 100° C., preferably about 100° C., at atmospheric pressure, or at temperatures above 100° C., usually 105° to 140° C., under superatmospheric pressure. If full dyeings are to be obtained particularly at temperatures of about 100° C., it is advantageous to add carriers to the dye liquor, for example aromatic carboxylic acids, such as benzoic acid, salicylic acid or phthalic acid or their methyl esters, or phenols, such as o-hydroxydiphenyl or p-hydroxydiphenyl, or aromatic halogen compounds, such as chlorobenzenes, or aromatic hydrocarbons, such as naphthalene or diphenyl, or carbinols, such as phenylmethyl carbinol. The dyes having the Formula I are however particularly suitable for dyeing polyester fibers by the high temperature method, i.e., at temperatures above 100° C. and under superatomspheric pressure as described above.

Print pastes which contain the said dyes in finely divided form together with conventional thickeners and printing assistants are used for printing polyester textile materials. It is advantageous to add carriers as well to the print pastes. When the material has been printed, it is steamed and finished off as usual. Examples of conventional thickeners are crystal gum, alginates, carob bean flour, starch ethers or starch. Examples of printing assistants are resorcinol, p-hydroxydiphenyl, o-hydroxydiphenyl and β-naphthol.

The new dyes have a very good affinity for textile materials of polyester fibers and yield dyeing having high color strength. The dyeings and prints thus obtained are distinguished by very good fastness properties, particularly very good light fastness and very good fastness to dry-heat pleating and setting. The dyes are also outstandingly suitable for dyeing mixtures of wool and polyester because they practically do not stain wool.

The invention is illustrated by the following examples in which parts and percentages are by weight unless stated otherwise. Parts by volume bear the same relation to parts by weight as the liter (STP) to the kilogram.

EXAMPLE 1

92 parts (0.3 mole) of the compound having the formula:

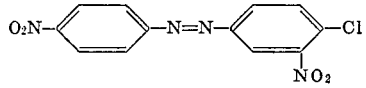

50 parts of N-acetyl-p-phenylene diamine (0.33 mole) and 27 parts (0.33 mole) of anhydrous sodium acetate are heated at 150° C. in 250 parts by volume of ethylene glycol for one hour. After the mixture has cooled to about 70° C., 150 parts by volume of methanol is added, the mixture further cooled to room temperature and the deposited dye is suction filtered. 123 parts of the dye having the formula:

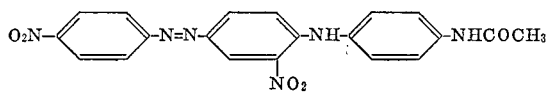

is obtained.

100 parts of a polyethylene terephthalate cloth is treated for ninety minutes at a temperature of 100° C. in a dye liquor which consists of 3000 parts by volume of water, 9 parts of finely divided o-phenylphenol and 0.5 part of finely divided dye having the above formula.

The dyed cloth is washed with water and then reductively cleaned for fifteen minutes at 85° C. in a liquor consisting of 3000 parts by volume of water, 3 parts of sodium dithionite and 3 parts of 32% caustic soda solution. The cloth is then washed again with water. An orange dyeing is obtained which has very good fastness, particularly very good fastness to dry-heat pleating and setting.

EXAMPLE 2

The procedure of the first paragraph of Example 1 is followed but the reaction is carried out with 12.2 parts of the chloroazo compound described in Example 1 and 20 parts of sulfonic-p-dimethylamide in 35 parts of dimethylformamide at 150° C. and the product is worked up as usual. 7.9 parts of the dye having the formula:

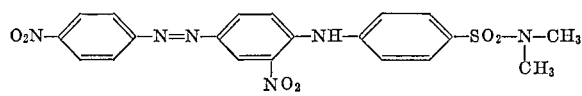

is obtained.

(a) 100 parts of polyethyelne terephthalate fiber flock is treated for forty-five minutes at 125° C. in a dye liquor consisting of 1000 parts by volume of water, 2 parts of a compound obtained by reaction of 1 mole of sperm oil alcohol with 80 moles of ethylene oxide followed by sulfonation and 0.5 part of the finely divided dye having the above formula. A yellow dyeing having very good color strength is obtained which is fast to light and dry-heat pleating and setting.

(b) A polyethylene terephthalate cloth is padded with a liquor which contains 15 parts of the finely divided dye of the above formula, 4 parts of a 50% solution of the sodium salt of a copolymer of 80 parts of ethyl acrylate and 20 parts of acrylic acid and 1.5 parts of an adduct of 40 moles of ethylene oxide to 1 mole of castor oil in 1000 parts of water, dried and heat set for thirty seconds at 200° C. A conventional reductive aftertreatment is then carried out. A yellow dyeing having good color strength and very good fastness properties is obtained.

EXAMPLE 3

10.2 parts of the compound having the formula:

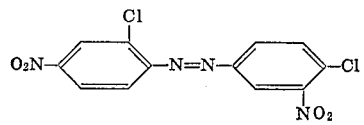

is boiled under reflux for three hours with 4.1 parts of p-anisidine and 1.6 parts of anhydrous soda in 100 parts by volume of n-butanol. The dye formed is suction filtered while still hot and washed with methanol and water. 10.3 parts of the dye having the formula:

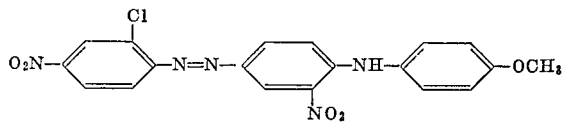

is obtained.

A polyethylene terephthalate cloth is printed with a print paste consisting of 20 parts of triisobutyl phosphate, 15 parts of a mixture of the sodium salts of disulfonimides of hydrocarbons having an average of ten carbon atoms in the molecule, 650 parts of crystal gum, 275 parts of water and 15 parts of the abovementioned dye. The printed cloth is dried and steamed under a pressure of 1.5 atmosphere gauge.

An orange print having good color strength and very good fastness properties is obtained.

The dyes in the following table are obtained by analogous methods. They give very good prints and dyeings on polyester fibers, particularly by the high temperature method.

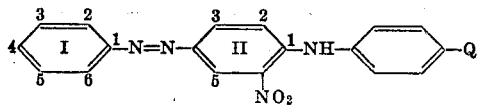

| Example No. | Ring I | Ring II | Q | Shade |
|---|---|---|---|---|
| 4 | 4-nitro | | —NH—COCCl₃ | Yellow. |
| 5 | do | | —COO—⟨H⟩ | Do. |
| 6 | do | | —CO—NH—⟨⟩—OCH₃ | Do. |
| 7 | do | | —CO—NH—CH₂—CH₂—OH | Do. |
| 8 | do | | —CO—NH—⟨⟩—Cl | Do. |
| 9 | 2-chloro-4-nitro | | —Cl | Orange. |
| 10 | do | | —O—CH₂—CH₂—OH | Do. |
| 11 | do | | —S—CH₂—CH₂—OH | Do. |
| 12 | do | | —NH—⟨⟩—OCH₃ | Dark brown. |
| 13 | do | | —NH—⟨⟩(COOCH₃) | Brown. |
| 14 | do | | —NH—⟨⟩(NO₂)—SO₂—N⟨O⟩ | Brown-orange. |
| 15 | do | | —NH—SO₂—⟨⟩—CH₃ | Orange. |
| 16 | do | | —COOC₂H₅ | Yellow. |
| 17 | do | | —COO—⟨H⟩ | Do. |
| 18 | do | | —CO—NH—⟨⟩ | Orange. |
| 19 | 2-methoxy-4-nitro | | —NH—CO—CH₃ | Do. |
| 20 | do | | —N⟨pyrrolidone⟩ | Do. |
| 21 | do | | —O—CH₂—CH₂—OH | Do. |
| 22 | 4-dimethylaminosulfonyl | | —O—CH₂—CH₂—OH | Yellow. |
| 23 | do | | —COOCH₃ | Do. |
| 24 | 2,6-dichloro-4-nitro | | —NH₂ | Brown. |
| 25 | do | | —NH—CO—CH₃ | Orange. |
| 26 | do | | —O—CH₂—CH₂—OH | Do. |
| 27 | do | | —S—⟨⟩—NH—CO—CH₃ | Brown-yellow. |
| 28 | do | | —NH—CH₂—CH₂COOC₂H₅ | Dark brown. |
| 29 | 2,4-dinitro | | —OC₂H₅ | Brown-orange. |
| 30 | do | | —NH—COOCH₂—CH₂—OCH₃ | Do. |
| 31 | do | | —O—CH₂—CH₂—OH | Do. |
| 32 | do | | —NH—⟨⟩(COOH₃) | Dark brown. |
| 33 | 2-methyl-4-nitro | | —O—CH₂—CH₂—OH | Orange. |
| 34 | 4-carbomethoxy | | —O—CH₂—CH₂—OH | Yellow. |
| 35 | do | | —CO—NH₂ | Do. |
| 36 | 4-carbo-ethoxy | | —OCH₂—CH₂—OH | Do. |
| 37 | 4-carbo-cyclo-hexyloxy | | —CO—N(CH₃)₂ | Do. |
| 38 | 2-bromo-4-nitro | | —NH—CO—CH₃ | Orange. |
| 39 | do | | —S—⟨⟩—NH₂ | Do. |

| Example No. | Ring I | Ring II | Q | Shade |
|---|---|---|---|---|
| 40 | 2,4,5-trichloro | | —NH₂ | Brown. |
| 41 | 2-nitro-4-methyl | | —NH—CO—CH₃ | Orange. |
| 42 | 3-nitro | | —O—CH₂—CH₂—OH | Yellow. |
| 43 | 2-chloro-4-nitro-6-bromo | | —O—CH₂—CH₂—OH | Brown-yellow. |
| 44 | 2,6-dibromo-4-nitro | | —O—CH₂—CH₂—OH | Brown. |
| 45 | do | | 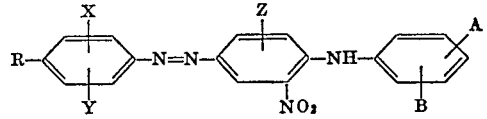 | Brown-orange. |
| 46 | 2,5-dichloro-4-nitro | | —O—CH₂—CH₂—OH | Do. |
| 47 | 4-nitro | 2-chloro | —N(C₂H₅)(CH₂—CH₂—OH) | Dark brown. |
| 48 | do | do | —NH—CO—CH₃ | Orange. |
| 49 | 2-chloro-4-nitro | do | —NH—CO—CH₃ | Do. |
| 50 | 4-nitro | 2-carbo-methoxy | —OCH₃ | Brown-orange. |
| 51 | do | 3-methyl | —OCH₃ | Orange. |
| 52 | 2-chloro-4-nitro | do | —OCH₃ | Do. |
| 53 | 2-methoxy-4-nitro | do | —NH₂ | Brown. |
| 54 | 4-nitro | 2-methyl | —NH₂ | Do. |
| 55 | 2,4-dinitro | 3-methoxy | —OCH₃ | Light brown. |
| 56 | 4-nitro | 2-methoxy | —O—CH₂—CH₂—OH | Brown orange. |
| 57 | 2-methoxy-4-nitro | 3-chloro | —OCH₃ | Orange. |
| 58 | | | 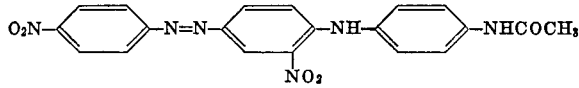 | Yellow. |
| 59 | | | 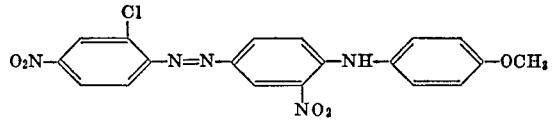 | Orange. |
| 60 | | | 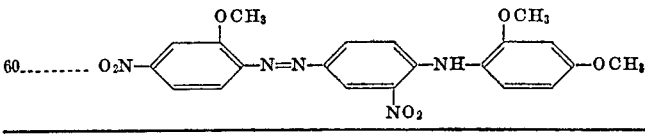 | Do. |

We claim:
1. A disperse azo dye of the formula

in which:
R denotes a member selected from the class consisting of hydrogen, chlorine, bromine, nitro, methyl, carbo-lower alkoxy, carbo-cyclohexyloxy, carbamoyl, dialkylsulfonamide of 1 to 2 carbon atoms in the alkyl groups and dialkylcarboxylamide of 1 to 2 carbon atoms in the alkyl groups;

A denotes a nonionic substituent;

B denotes a member selected from the class consisting of hydrogen, methyl and methoxy; and X, Y and Z denote a member selected from the class consisting of hydrogen, chlorine, bromine, nitro, alkyl of 1 to 4 carbon atoms, alkoxy of 1 to 4 carbon atoms and carboalkoxy of 1 to 4 carbon atoms.

2. The compound having the formula:

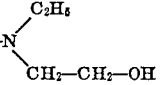

3. The compound having the formula:

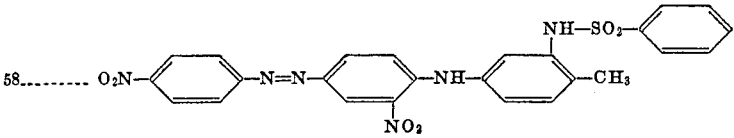

4. The compound having the formula:

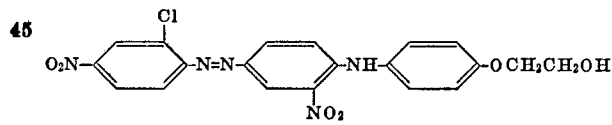

5. The compound having the formula:

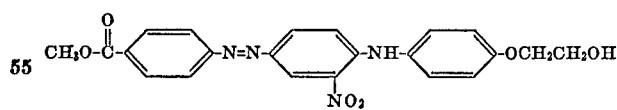

6. The compound having the formula:

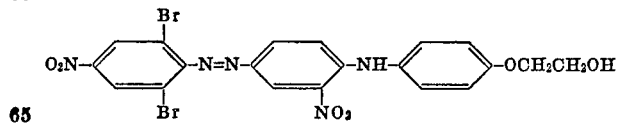

No references cited.

CHARLES B. PARKER, Primary Examiner

D. M. PAPUGA, Assistant Examiner

U.S. Cl. X.R.

8—41, 54, 55; 260—152, 205, 207, 207.1, 207.5

PO-1050
(5/69)

UNITED STATES PATENT OFFICE
CERTIFICATE OF CORRECTION

Patent No. 3,516,982               Dated June 23, 1970

Inventor(s) Peter Dimroth et al

It is certified that error appears in the above-identified patent and that said Letters Patent are hereby corrected as shown below:

Column 3, line 26, "superatomspheric" should read -- superatmospheric --.

Column 4, line 22, "polyethyelne" should read -- polyethylene --; line 69, "atmosphere" should read -- atmospheres --.

Column 6, in the table, example No. 32, that portion of the formula reading "COOH₃" should read -- COOCH₃ --.

Column 8, in the references, insert:

-- 2,887,477   5/1959    Straley et al. _ _ _ _ _   260-149 --.

SIGNED AND
SEALED
OCT 13 1970

(SEAL)
Attest:

Edward M. Fletcher, Jr.
Attesting Officer

WILLIAM E. SCHUYLER, JR.
Commissioner of Patents